United States Patent [19]

Byker

[11] Patent Number: 4,659,443
[45] Date of Patent: Apr. 21, 1987

[54] HALOGENATED AROMATIC COMPOUND REMOVAL AND DESTRUCTION PROCESS

[75] Inventor: Harlan J. Byker, Columbus, Ohio

[73] Assignee: PCB Sandpiper, Inc., Columbus, Ohio

[21] Appl. No.: 643,148

[22] Filed: Aug. 22, 1984

[51] Int. Cl.$^4$ .............................................. C02F 1/46
[52] U.S. Cl. .................................. 204/131; 204/186; 204/190
[58] Field of Search ................ 204/149, 72, 131, 151, 204/186, 190; 208/262

[56] References Cited

U.S. PATENT DOCUMENTS

| | | | |
|---|---|---|---|
| 4,022,795 | 5/1977 | Bamfield et al. | 546/259 |
| 4,072,596 | 2/1978 | Moeglich | 204/149 |
| 4,120,761 | 10/1978 | White | 204/72 |
| 4,144,152 | 3/1979 | Kitchens | 204/158 R |
| 4,161,435 | 7/1979 | Moeglich | 204/149 |
| 4,299,704 | 11/1981 | Foss | 210/634 |
| 4,326,090 | 4/1982 | Smith et al. | 585/469 |
| 4,345,983 | 8/1982 | Wan | 204/158 R |
| 4,351,718 | 9/1982 | Brunelle | 208/262 |
| 4,353,798 | 10/1982 | Foss | 210/181 |
| 4,377,471 | 3/1983 | Brown et al. | 208/262 |
| 4,379,746 | 4/1983 | Norman et al. | 208/262 |
| 4,379,752 | 4/1983 | Norman | 210/712 |
| 4,400,566 | 8/1983 | Colon | 204/72 |
| 4,405,448 | 9/1983 | Googin et al. | 208/262 |
| 4,443,309 | 4/1984 | Van Duin et al. | 204/149 |

FOREIGN PATENT DOCUMENTS 0027745 4/1981 European Pat. Off. .

OTHER PUBLICATIONS

Chemical Abstracts, vol. 93, 1980, p. 311, abstract No. 137486(c).
Chemical Abstracts, vol. 87, 1977, pp. 275-276, abstract No. 188952(k).
Chemical Abstracts, vol. 87, 1977, p. 135, abstract No. 186870(h).

Primary Examiner—Terryence Chapman
Attorney, Agent, or Firm—Mueller and Smith

[57] ABSTRACT

Disclosed is a process for removing a halogenated aromatic compound (eg. a polychlorinated biphenyl or PCB) from a liquid carrier (eg. a transformer oil) contaminated therewith and for dehalogenating said removed halogenated aromatic compound. The process comprises mixing the contaminated carrier with a solvent for extracting halogenated aromatic compound from said carrier into said solvent and separating the contaminated solvent from the cleansed carrier. The contaminated solvent then is passed into an electrolytic cell for electrolytically dechlorinating said halogenated aromatic compound. The preferred cathode is mercury and the preferred anode is titanium coated with ruthenium dioxide. The cell additionally contains an electrolyte soluble in the solvent and a source of hydrogen ions (eg. HCl). The preferred solvent is a cyclic ester (eg. propylene carbonate). The equipment for practicing the process of the present invention conveniently can be set up in the field for treating PCB contaminated transformer oil in electrical transformers.

21 Claims, 2 Drawing Figures

HALOGENATED AROMATIC COMPOUND REMOVAL AND DESTRUCTION PROCESS

BACKGROUND OF THE INVENTION

This invention relates to a process for extraction and dehalogenation of halogenated aromatic hydrocarbons. More specifically, it relates to a process for extracting and dechlorinating polychlorinated biphenyls (PCB's).

Polychlorinated biphenyls are a group of several hundred organic compounds which have a basic structure of two benzene rings joined by a single (sigma) bond to form a biphenyl. Chlorine atoms are substituted for some of the hydrogen atoms of the benzene rings. Commercial mixtures of PCB's generally contain 40 to 60 percent chlorine and have as many as 50 detectable isomers. Mixtures of PCB's are extremely resistant to degradation; are thermally stable; are resistant to oxidation; are resistant to reaction with acids, bases and other chemicals; and are good electrical insulators. PCB's also are very effective fire retardants and have been used as such in fluids which operate at high temperatures and in electrical transformers and capacitors.

A problem associated with the use of PCB's is that they are toxic organic chemicals. It has been found that PCB's tend to remain in the fatty tissues of an organism once entry has been gained and eventually can accumulate to toxic levels. For this reason, the sole U.S. manufacturer of PCB's has stopped its production.

More than 90 percent of all PCB's produced were used in electrical devices-mainly transformers and capacitors. Under existing federal regulations, PCB's still in use eventually must be removed from service and destroyed. Electric utilities, who own the majority of the nation's PCB inventory, are very interested in finding an inexpensive and environmentally acceptable method of destroying PCB's. Unfortunately, because of their recalcitrance to reaction, and thermal stability, PCB's are extremely difficult to safely and economically destroy. It is particularly difficult to remove PCB's from askarel transformers, which have very high concentrations of PCB's even after the fluid in the transformer has been cleaned or replaced, because PCB's continue to be leached out of the transformer components and recontaminate the fluid. Thus, these transformers have to be cleaned by a process which will continue to remove PCB's from the fluid for a period of days or weeks which adds to the expense of such process.

One of the safest and environmentally acceptable methods of destroying PCB's is incineration. However, incinerators are expensive to operate. Additionally, there are high insurance, transportation, and fuel costs associated with incineration. Public opposition to the transportation and processing of toxic materials also makes incineration unpopular.

There are a number of chemical processes for destroying PCB's. One process which is in commercial use involves reductive dechlorination which is used for mineral oil containing PCB's and renders the PCB's inert while allowing salvage of the mineral oil carrier. A disadvantage of the process is that it is most suitable for processing large quantities of contaminated oil (i.e. quantities in excess of 380 liters) and is not easily scaled down to adapt it to process the small quantities of oil (i.e. on the order of 76 to 152 liters) which are typically found in electrical transformers. Additionally, the equipment for the process is expensive and economically cannot be left in place for the length of time required to process the small quantities of material found in electrical transformers. Furthermore, the process is limited to processing oil having PCB concentrations of less than 10,000 parts per million (ppm) (1%).

Broad Statement of the Invention

The present invention is directed to a process for removing a halogenated aromatic compound from a liquid carrier contaminated therewith and for dehalogenating the removed halogenated aromatic compound. Such process comprises mixing said contaminated carrier with a solvent in a mixing zone. The solvent is immiscible with the carrier, is stable under electrolytic conditions, and is stable in the presence of chlorine gas. The mixture is withdrawn from the mixing zone and passed into an extraction zone wherein halogenated aromatic compound is extracted from the liquid carrier into the solvent. From the extraction zone is withdrawn the carrier diminished in halogenated aromatic compound content and contaminated solvent. The contaminated solvent stream is passed into an electrolytic cell containing an anode and a cathode. The cell additionally contains an electrolyte soluble in the solvent and a source of hydrogen ions. An electric potential is impressed between the anode and the cathode to cathodically dechlorinate the aromatic compound, which dechlorinated aromatic compound and solvent then may be withdrawn from the electrolytic cell.

Advantages of the present invention include the ability to treat liquid carriers, eg. oil, having high concentrations of PCB's. Another advantage is a process which does not result in a residue, which residue is difficult to dispose. Another advantage is the ability to reclaim a cleansed liquid carrier from the process. A further advantage is the ability to adapt the process for removing and destroying PCB's contaminating oil contained in electrical transformers and other electrical devices, which process does not require transportation of the oil. These and other advantages of the process are accomplished by a process which is economical and environmentally acceptable. Additional advantages will be readily apparent to those skilled in the art based upon the disclosure contained herein.

The drawings will be described in detail in connection with the description of the invention which follows.

DETAILED DESCRIPTION OF THE INVENTION

Figure 1:
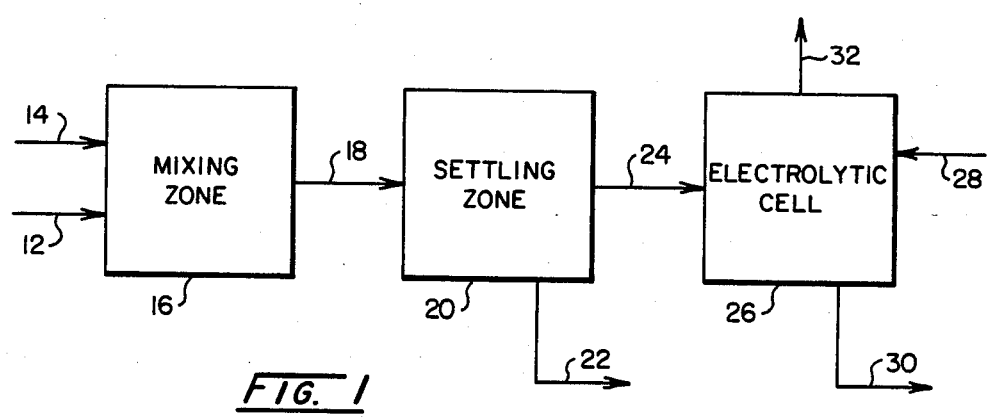
FIG. 1 is a process flow diagram showing generally how the present invention is practiced.

The present invention is a multi-step process for cleansing a liquid carrier which is contaminated with a halogenated aromatic compound and for converting the halogenated aromatic compound into a much less toxic form which is more readily handleable for disposal and/or reuse. Such extraction/dechlorination process is illustrated in the drawings. Referring to FIG. 1, a flow of contaminated liquid carrier flows via line 12 along with a flow of solvent via line 14 into mixing zone 16 wherein the two flows are intimately mixed. Mixing zone 16 may be a vessel fitted with mechanical agitation means, eg. a fixed stirrer, or may be a packed column through which the flows are passed. Alternatively, the flows may be sprayed into mixing zone 16 for their mixing. The resulting mixed flow then is withdrawn from mixing zone 16 via line 18 and passed into settling zone 20 which most conveniently is a gravity settling zone. The liquid carrier and solvent are separated into an upper layer and a lower layer in settling zone 20 depending upon their relative densities. Means for enhancing gravity separation via centrifugation or similar effect may be applied as is necessary, desirable, or convenient in conventional fashion. Regardless of the mode of operation of extraction zone 20, at least a portion of the halogenated aromatic compound contaminate is extracted from the liquid carrier into the solvent. The temperature at which the extraction zone is held as well as the nature of the particular reactants will determine the equilibrium concentration of halogenated aromatic compound contaminate established in the liquid carrier and the solvent contained in settling zone 20. It should be recognized that mixing zone 16 and settling zone 20 may be a single zone if desired.

The liquid carrier depleted in halogenated aromatic compound content is withdrawn from extraction zone 20 via line 22 for disposal, reuse, or recycle to mixing zone 16. Solvent bearing halogenated aromatic compound contaminate is withdrawn from settling zone 20 via line 24 and passed into electrolytic cell 26. A source of hydrogen ions additionally is passed into electrolytic cell 26 via line 28. When an electric potential is impressed between the anode and cathode within electrolytic cell 26, the halogenated aromatic compound is cathodically dechlorinated. Solvent bearing dechlorinated aromatic compound is withdrawn from electrolytic cell 26 via line 30 and chlorine by-product is withdrawn from the cell via line 32.

Figure 2:
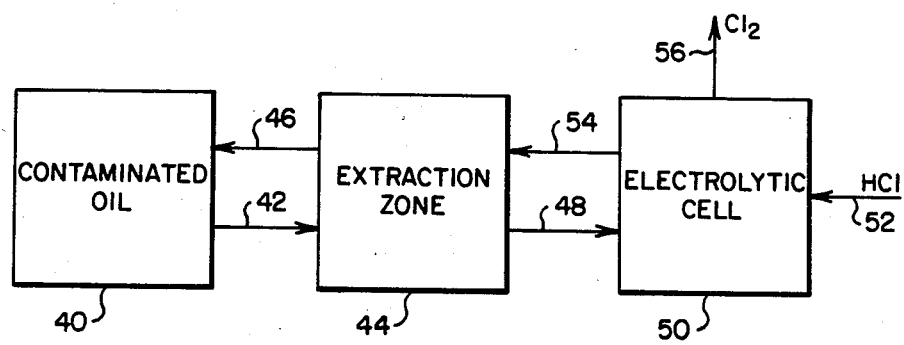
FIG. 2 is a process flow diagram showing a preferred embodiment of the invention for on-site processing of contaminated oil in a transformer.

As stated above, the present invention provides the flexibility and adaptability to be utilized in the field for treating contaminated oil, for example, contained in electrical transformers. For such in-field use, the process scheme would be practiced in accordance with FIG. 2. Referring to FIG. 2, contaminated oil 40, as contained in a transformer, would be passed via line 42 into extraction zone 44 which would serve as a combination mixing and settling zone wherein an upper oil phase diminished in halogenated aromatic compound content would be established along with a lower solvent phase enriched in halogenated aromatic compound content. The interface between said phases would be established so that only oil would be withdrawn from extraction zone 44 via line 46 for recycle to the transformer oil pool 40. Solvent enriched in halogenated aromatic compound content is withdrawn from extraction zone 44 via line 48 and passed into electrolytic cell 50 along with a flow of HCl via line 52 which flow serves as the hydrogen ion source required in the process. Voltage impressed across the anode and cathode in electrolytic cell 50 causes cathodic dechlorination of the contaminate with concomitant production of by-product chlorine gas which is removed from cell 50 via line 56. Solvent containing dechlorinated aromatic compound is withdrawn from cell 50 via line 54 for recycle to extraction zone 44. It will be appreciated that after a matter of days, or perhaps weeks, the contaminated oil reservoir in the transformer would be processed to contain a level of PCB's which is environmentally acceptable without any need for transportation of the contaminated oil, while transportation is quite unpopular today.

With respect to the reactants required in practicing the process of the present invention, suitable solvents must possess the ability to solvate the halogenated aromatic compounds and must not be appreciably, if at all, miscible in the liquid carriers bearing such halogenated aromatic compound contaminates. In the preferred embodiment, the solvents must not be miscible in transformer oil. Additionally, suitable solvents must be stable to reactions occurring at the anode and the cathode in the electrolytic cell and must be stable (inert) in the presence of chlorine gas and chloride ions. A class of solvents which meets these criteria are cyclic ketone solvents such as, for example, cylopentanone. A preferred sub-class of cyclic ketone solvents for use in the process of the present invention are lactone solvents (i.e. cyclic ester solvents). Representative lactone solvents include, for example, valerolactone (racemic mixture) and butyrolactone. The most preferred class of ketone solvents, however, are cyclic carbonate solvents such as, for example, propylene carbonate (2-methyl-1,3-dioxolan-2-one) and ethylene carbonate (1,3-dioxolan-2-one). Of the cyclic carbonate solvents, propylene carbonate is the most preferred solvent presently.

The electrolytic cell desirably is divided into an anode compartment and a cathode compartment by conventional porous membranes including ceramic membranes, porous metal membranes, porous resin membranes including ionic membranes, and the like. Separation of the reactions and products at the two electrodes is preferred for minimizing undesirable by-product formation and for ease in recovering the products of the reaction; however, it must be recognized that an undivided cell would permit lower voltages to be used in the process.

A variety of conventional electrolytes (catholytes and anolytes) can be used in the electrolytic bath which is established in the electrolytic cell or practice of the present process. It does not appear that any particular electrolyte is critical for successful practice of the invention so long as the electrolyte is stable in the presence of chlorine and stable under electrolytic conditions established within the electrolytic cell. Suitable electrolytes include quaternary ammonium salts (eg. tetraalkyl ammonium salts), alkali metal salts (eg. lithium chloride salts), aluminum chloride salts, and the like and mixtures thereof. Sufficient electrolyte is added to the solvent to provide conductivity of the electrolytic bath established within the electrolytic cell. When an anode compartment and a cathode compartment are established within the electrolytic cell, preferably the anolyte is of the same composition as is the catholyte for economy and simplicity in operating the present invention, though a variety of differing anolytes may be used for successfully practicing the present invention.

The cathode may be a conventional solid cathode such as zinc, lead, or tin, and may have a geometric form of a screen, right cylinder, or other conventional electrode form. Alternatively, the cathode may be a pool of mercury established within the lower section of the cathode compartment of the electrolytic cell. The anode preferably is constructed of titanium coated with ruthenium dioxide, although carbon or other material may be suitably employed. An electric potential is impressed between the anode and the cathode in conventional fashion. Electrolytic conditions established within the electrolytic cell include cathode current densities as low as $10^{-6}$ amps/cm² on up to 0.1 amps/cm² or more. Voltages associated with such currents range from about 2 to 20 volts. The electrolytic bath contained within the electrolytic cell typically will be at room temperature although the temperature of the bath may range from as low as $-50°$ C. on up to $70°$ C. or higher.

In the electrochemical cell, the halogenated aromatic compound comes into contact with the cathode where reductive dechlorination occurs. The mechanism of reductive dechlorination of chlorinated aromatic compounds in aprotic solvents as been studied by Farwell et al., *J. Electronanal. Chem.*, 61, pp 303–314 and 315–324 (1975). Such mechanism has been shown to involve the replacement of chlorine with hydrogen when two electrons per chlorine atom are transferred to the chlorinated aromatic compound. In the process of the present invention, a source of hydrogen ions needs to be provided for the reductive dechlorination to occur. A variety of hydrogen ion sources may be provided, though it must be recognized that the selection of hydrogen ion source will influence the form in which the chlorine by-product results. Additionally, the hydrogen ion source should not be soluble in the solvent if the solvent is to be recycled for reuse in extracting additional contaminate from contaminated liquid carrier. A preferred hydrogen ion source is HCl which conveniently may be supplied in the form of a gas to be bubbled into the electrolytic bath established in the electrolytic cell. Other possible hydrogen ion sources include, for example, HBr, HI, phenols, alcohols, and the like and mixtures thereof. Water provides hydrogen ions, but uses up current by its electrolysis, and, thus, is not recommended.

The overall electrochemical reactions which occur in the electrolytic cell for the dechlorination of halogenated aromatic compounds are set forth below with specific reference to PCB's (note that $Cl_x$ below represents one or more chlorine atoms distributed around each or both of the biphenyl rings).

Cathode Reaction

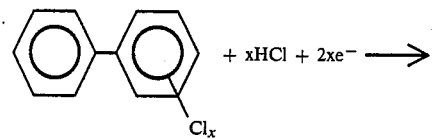

Anode Reaction

$2xCl^- \longrightarrow xCl_2 + 2xe^-$

Net Reaction

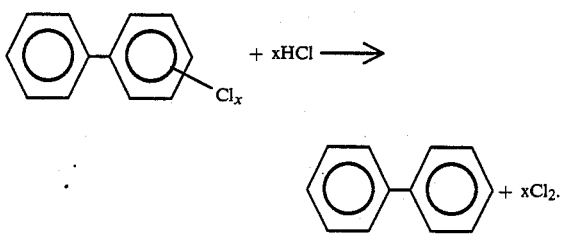

The following examples show in detail how the present invention has been practiced but should not be construed as limiting. In this application, all percentages and proportions are by weight and all units are in the metric system, unless otherwise expressly indicated. Also, all references cited herein are expressly incorporated herein by reference.

IN THE EXAMPLES

EXAMPLE 1

Each compartment of a two compartment electrochemical cell, with a glass frit membrane separating the two compartments, was filled with propylene carbonate solvent containing 0.5M tetraethylammonium chloride electrolyte (hereinafter referred to as propylene carbonate solution). A mercury pool cathode and a silver wire pseudo-reference electrode were placed in the cathode compartment of the cell and pure PCB material (54 weight percent chlorine) was added to establish a PCB concentration of 5800 ppm in the cathode compartment. A vitreous carbon anode was placed in the anode compartment. A three electrode potentiostat was used to maintain the mercury pool cathode at a 31 2.0 volts with respect to the reference electrode. The cathode compartment solution was stirred and maintained under an argon atmosphere. Dry HCl gas was bubbled through the electrolyte bath in the cathode compartment intermittently. After 18 hours of electrolysis, the cathode compartment bath was analyzed by gas chromatography with an electron capture detector and was found to contain 0.15 ppm PCB's.

EXAMPLE 2

The cathode compartment of a two compartment cell like that of Example 1 was half filled with propylene carbonate solution and half filled with transformer oil containing 500 ppm PCB's. The PCB contaminated oil formed an immiscible layer on top of the propylene carbonate solution. Only propylene carbonate solution was placed in the anode compartment. The electrode materials were the same as in Example 1 and the propylene carbonate solution under the transformer oil was gently stirred. The PCB's extracted from the oil into the propylene carbonate were electrolyzed at the memory cathode. The extraction and electrolysis were carried out for several days, after which time the PCB content of the transformer oil was found to be only 45 ppm.

EXAMPLE 3

An experimental set-up like that of Example 1 was used with a zinc foil cathode. The starting concentration of PCB's in the cathode compartment propylene carbonate solution as 1000 ppm. After 22 hours of electrolysis, PCB content of the propylene carbonate solution was 700 ppm.

EXAMPLE 4

An experimental set-up like that of Example 1 was used with a lead foil cathode. The starting concentration of PCB's in the cathode compartment propylene carbonate solution as 1100 ppm. After 30 hours of electrolysis, PCB content of the propylene carbonate solution was 300 ppm.

EXAMPLE 5

An experimental set-up like that of Example 1 was used with a tin foil cathode. The starting concentration of PCB's in the cathode compartment propylene carbonate solution was 1100 ppm. After 31 hours of electrolysis, the PCB content of the propylene carbonate solution was 300 ppm.

EXAMPLE 6

A 10 liter electrochemical cell was fitted with a porous polypropylene membrane. A mercury pool cathode, a ruthenium dioxide coated titanium anode and a silver wire pseudo-reference electrode were used in the manner described in Example 1. A propylene carbonate solution (0.5M tetraethylammonium carbonate) was circulated from the cathode compartment of the cell to an extraction apparatus and then returned to the cathode compartment of the cell. Oil containing 700 ppm PCB's was circulated through the extraction apparatus counter-current to the flow of propylene carbonate solution. After 740 hours of electrolysis, the PCB content of the oil was analyzed to be 39 ppm.

I claim:

1. A method for removing a halogenated aromatic compound from a liquid carrier contaminated therewith and for dehalogenating the halogenated aromatic compound removed from said liquid carrier, which comprises:
   (a) mixing said carrier contaminated with said halogenated aromatic compound with a solvent to form a mixture in a mixing zone for extracting said halogenated aromatic compound into said solvent, said solvent being immiscible with said carrier, stable under electrolysis conditions, and stable to chlorine;
   (b) withdrawing said mixture from said mixing zone and passing same into a settling zone for permitting said mixture to form a carrier layer diminished in halogenated aromatic compound content and a solvent layer enriched in halogenated aromatic compound content;
   (c) withdrawing said solvent layer enriched in halogenated aromatic compound content from said settling zone and passing same into an electrolytic cell containing an anode and a cathode, said cell additionally containing an electrolyte soluble in said solvent and a source of hydrogen ions which does not include water; and
   (d) impressing an electric potential between said anode and said cathode to cathodically dechlorinate said aromatic compound.

2. The method of claim 1 wherein said halogenated aromatic compound comprises polychlorinated biphenyls.

3. The method of claim 1 wherein said solvent comprises a cyclic ketone.

4. The method of claim 1 wherein said solvent comprises a cyclic ester.

5. The method of claim 4 wherein said cyclic ester solvent is a cyclic carbonate solvent.

6. The method of claim 1 wherein said solvent is selected from the group consisting of propylene carbonate, ethylene carbonate, cyclopentanone, valerolactone, butyrolactone, and mixtures thereof.

7. The method of claim 1 wherein said cathode comprises a material selected from the group consisting of mercury, zinc, lead, and tin.

8. The method of claim 7 wherein said cathode comprises mercury.

9. The method of claim 1 wherein said anode comprises a material selected from the group consisting of: carbon; and titanium coated with ruthenium dioxide.

10. The method of claim 9 wherein said anode comprises titanium coated with ruthenium dioxide.

11. The method of claim 1 wherein said hydrogen ion source comprises HCl.

12. The method of claim 1 wherein said electrolyte is selected from the group consisting of quaternary ammonium salts, metal halide salts, and mixtures thereof.

13. The method of claim 12 wherein said electrolyte is selected from the group consisting of tetraalkyl ammonium halides, aluminum chloride, lithium chloride, and mixtures thereof.

14. The method of claim 1 wherein said mixing zone and said settling zone are the same zone.

15. The method of claim 1 wherein said carrier layer diminished in halogenated aromatic compound content is withdrawn from said settling zone and recycled to said mixing zone.

16. The method of claim 1 wherein solvent bearing dehalogenated aromatic compound and said electrolyte is withdrawn from said electrolytic cell and recycled to a zone selected from the group consisting of said mixing zone, said settling zone, and both said zones.

17. The method of claim 1 wherein said electrolytic cell is divided by a porous membrane into an anode compartment containing said anode and a cathode compartment containing said cathode.

18. A method for removing polychlorinated biphenyls from an oil contaminated therewith and for dehalogenating said removed polychlorinated biphenyls, which comprises:
   (a) mixing said oil contaminated with said polychlorinated biphenyls with a solvent in an extraction zone for extracting said polychlorinated biphenyls into said solvent and permitting oil diminished in polychlorinated biphenyls to form an upper layer and solvent enriched in polychlorinated biphenyls to form a lower layer, said solvent comprising a cyclic ester which contains an electrolyte soluble therein;
   (b) withdrawing from said extraction zone, said oil diminished in polychlorinated biphenyls;
   (c) withdrawing from said extraction zone said solvent enriched in polychlorinated biphenyls and passing same into an electrolytic cell containing an anode and a cathode, said cathode comprising a material selected from the group consisting of mercury, zinc, lead, and tin, said anode comprising material selected from the group consisting of: carbon; and titanium coated with ruthenium dioxide; and
   (d) impressing an electric potential between said anode and said cathode while passing HCl through said solvent enriched in polychlorinated biphenyls to cathodically dechlorinate said polychlorinated biphenyls;
   (e) withdrawing by-product chlorine gas from said electrolytic cell; and
   (f) withdrawing said cell solvent containing dechlorinated biphenyls and said electrolyte and recycling same to said extraction zone.

19. The method of claim 18 wherein said cathode is mercury and said anode is titanium coated with ruthenium dioxide.

20. The method of claim 18 wherein said cyclic ester is propylene carbonate.

21. The method of claim 18 wherein said electrolytic cell is divided by a porous membrane into an anode compartment containing said anode and a cathode compartment containing said cathode.

* * * * *